United States Patent [19]

Gossalter

[11] 4,397,350

[45] Aug. 9, 1983

[54] FLOW GUIDING IN TUBE BUNDLE HEAT EXCHANGERS

[75] Inventor: Rene Gossalter, St. Gallen, Switzerland

[73] Assignee: Swisscal Holding S.A., Panama

[21] Appl. No.: 287,956

[22] Filed: Jul. 29, 1981

Related U.S. Application Data

[63] Continuation of Ser. No. 5,502, Feb. 22, 1979, abandoned.

[30] Foreign Application Priority Data

Jan. 23, 1978 [CH] Switzerland .............................. 667/78

[51] Int. Cl.$^3$ ................................................ F28F 9/22
[52] U.S. Cl. ...................................... 165/159; 165/162
[58] Field of Search ................................. 165/158-162

[56] References Cited

U.S. PATENT DOCUMENTS

| | | | |
|---|---|---|---|
| 2,496,301 | 2/1950 | Meixl | 165/158 |
| 2,581,121 | 1/1952 | McCurdy, Jr. et al. | 165/76 |
| 3,277,959 | 10/1966 | Withers | 165/162 |
| 3,292,691 | 12/1966 | Welter | 165/162 |

FOREIGN PATENT DOCUMENTS 2410292  9/1975  Fed. Rep. of Germany ...... 165/159

Primary Examiner—William R. Cline
Assistant Examiner—Theophil W. Streule
Attorney, Agent, or Firm—Charles W. Fallow; Martin P. Hoffman

[57] ABSTRACT

A heat exchanger is disclosed as including a bundle of tubes within a tubular casing, wherein uniform helical flow of a heat exchange medium within the casing is created by a series of stepped transverse baffle plates having the shape of circular sectors. Successive sectors are interconnected by cylindrical supports which are positioned between neighboring exchanger tubes in order to prevent the medium from flowing between successive baffle plates.

5 Claims, 4 Drawing Figures

FLOW GUIDING IN TUBE BUNDLE HEAT EXCHANGERS

CROSS-REFERENCE TO RELATED APPLICATION

This application is a continuation of U.S. patent application Ser. No. 5,502, filed Feb. 22, 1979 now abandoned.

BACKGROUND OF THE INVENTION

This invention relates to heat exchangers and more particularly to a device for guiding fluid flow around a tube bundle in a heat exchanger.

The invention makes possible the improvement in the heat transfer at a low pressure drop and the simple threading of the individual tubes in mounting the tube bundle apparatus.

Without any guiding device, media flow on the exterior of a tube bundle within a casing is parallel to the tubes. Also, without any flow guiding device, the velocity distribution is non-uniform over the outer surface of the tubes so that, in relationship to the pressure loss, low heat transfer figures are produced.

As is known, the heat transfer increases less than proportionally to the velocity, whilst the pressure loss increases considerably more than proportionally, practically quadratically.

Furthermore it is known that the heat transfer when the tubes are subject to cross flow is considerably increased with respect to the heat transfer which can be achieved with longitudinal flow.

Guide means for providing a better distribution of the flow velocity and, above all, for providing partial cross flow, are known in the form of so-called fittings or baffles.

However, the guide means known up till now have considerable deficiencies. They provide a low heat transfer and yield but a disproportionately high pressure loss.

In addition, there exist with the known guide means, zones of low flow velocity in which the danger of deposit formations is increased.

Among other things, segmented circular baffles are known which are mounted in the external space transverse to the axes and at uniform distances from one another and with the edges of the segments against one another.

These guide means force the medium to flow to and fro in the external space thus, in part transversely with respect to the tubes, whereby the medium flows around the edges of the segments at more or less 180°. This enforced change in direction of 180° produces very non-uniform velocity distributions and partial longitudinal flows in the external space so that an improvement in the heat transfer corresponding to the pressure loss cannot be achieved.

Moreover, so-called disc fittings are known in the heat exchanger art. Normally, these discs have a circular opening in the center so that the flow can pass through and toward a baffle plate of larger diameter than the central opening in the preceding disc.

With the disc guiding means, the medium flowing in the external space is only partially guided transversely with respect to the fitted tubes and the changes in direction of 180° worsen the ratio of the heat transfer to the pressure loss in the same manner as with the segmented means.

SUMMARY OF THE INVENTION

As opposed to the previously known arrangements, a flow guiding means in accordance with the invention enables a substantially uniform helical flow with a uniform transverse flow over the tubes.

A flow guiding means in accordance with the invention includes a plurality of circular sector shaped baffles each subtending an angle equal to or less than 180°, and spacing supports which retain the circular sector baffles at the same or uniformly varied spacing.

The circular sector baffles are arranged in rotation about the axis of the apparatus by substantially the size of the circular sector angle so that a spiral staircase arrangement extends through the external space of the tube bundle apparatus.

The flow cross-section which is available to the medium is varied by changing the level of the spacing supports. In this manner, the flow velocity in the external space can be varied as desired.

Flow guiding means according to the invention produce a uniform transverse flow, without a rapid and repeated change in the direction of flow.

With the flow guiding means in accordance with the invention there are no zones of considerably reduced velocity.

One advantage provided by the invention is that the velocity is uniformly distributed over the flow path and the heat transfer is substantially greater with the same pressure loss. Furthermore, the danger of deposits forming is very greatly reduced.

By increasing or reducing the spacing of the circular sector discs along the flow path, the changes in volume of the medium flowing through the external space of the tube bundle apparatus can be so balanced that the flow velocity is maintained at the value most desirable for heat transfer.

When using the invention in the assembly of condensors or evaporators, the average heat transfer, for example, can be substantially increased.

BRIEF DESCRIPTION OF THE DRAWINGS

An ambodiment of a flow guiding means according to the invention is illustrated by way of example in FIGS. 1 to 4 of the drawings.

DESCRIPTION OF THE PREFERRED EMBODIMENT

Figure 3:
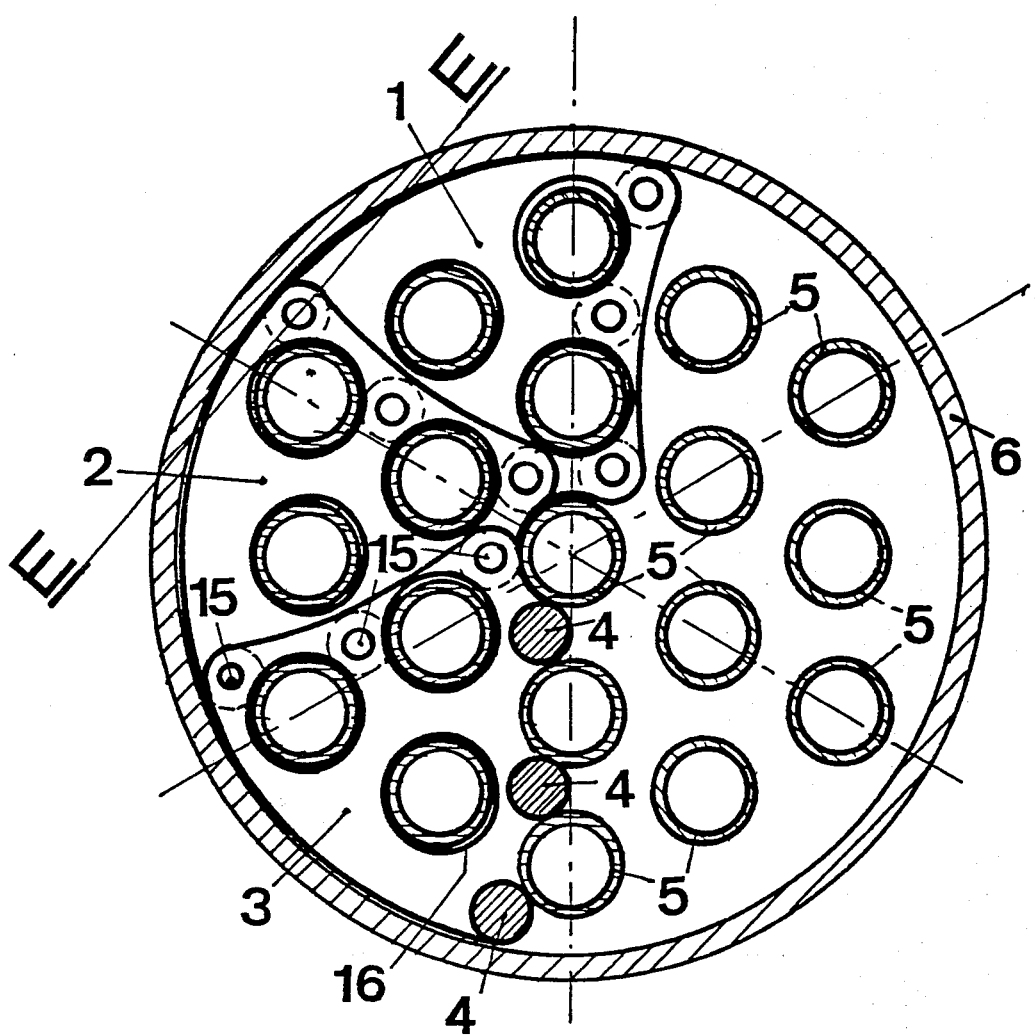
FIG. 3 represents a cross-section through a tube bundle apparatus transverse to the axis in which, for the sake of better visibility, only three circular sector baffles have been drawn.

Referring to FIG. 3, the invention is imbodied in a heat exchanger defined by an outer casing 6 containing a bundle of tubes 5 which extend along the casing 6 parallel to its longitudinal axis. A series of transverse baffle plates are provided at intervals along the length of the casing 6, successive baffles being radially displaced less than 180° (60° is illustrated) with respect to one another so as to define a helical path for fluid flow through the casing 6. The baffles are substantially identical, three representative baffles 1, 2 and 3 being shown in FIG. 3.

Figure 2:
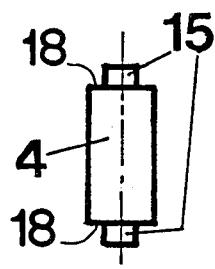
FIG. 2 illustrates a spacing support for maintaining the circular sector baffles at an appropriate spacing.

FIG. 2 shows one of the baffles 3 in detail. Each baffle has the general shape of a circular sector defined by a leading edge 7, a trailing edge 8 and an outer edge 9 which conforms closely to the internal diameter of the casing 6. Each baffle has apertures 16 therein, through each of which one of the tubes 5 freely extends.

Figure 1:
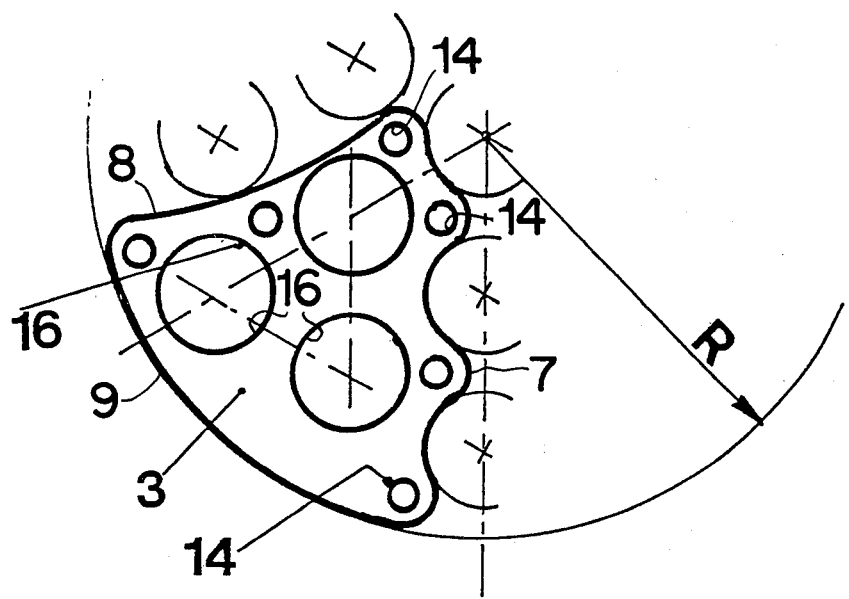
In FIG. 1, a view of a circular sector baffle is illustrated with a sector angle of 60°.

The baffles are not attached to either the casing 6 or the tubes 5 but are, rather, connected to axially adjacent baffles by means of cylindrical supports 4, one of which is shown in detail in FIG. 2. The ends of each support 4 are reduced in diameter to form pins 15 that fit holes 14 (FIG. 1) in the baffle plates. The reduced diameters define shoulders 18 on each support, the distance between shoulders determining the baffle spacing. Preferably, all of the supports 4 are identical, so that the baffles are uniformly spaced.

Figure 4:
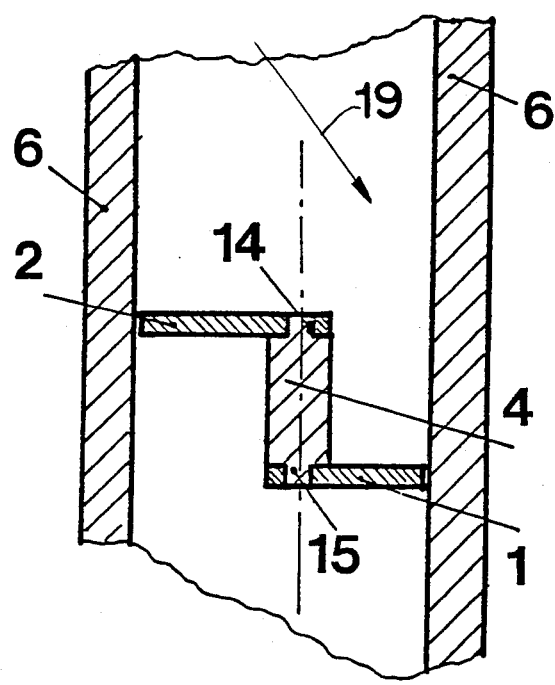
FIG. 4 shows a section on the section line E—E illustrated in FIG. 3.

A noteworthy feature of the invention is that the supports 4 are mounted in abutting relationship with the adjacent tubes 5 and with the casing 6. For example, support 4A contacts tubes 5A and 5B over its entire length, and support 4C fills the space between tube 5C and the casing 6. As best seen in FIG. 3, the supports 4 and the tubes 5 thus cooperate to define a continuous barrier to fluid flow in the tangential direction between successive baffles, which would otherwise occur. FIG. 4 illustrates the barrier formed by a support 4, which constrains fluid to follow the generally helical flow path 19 indicated.

In use, a first heat exchange medium is passed through the casing 6 while a second medium is passed through the heat exchange tubes 5. As the first medium flows through the casing 6, it is deflected away from the axial direction by the series of baffles within the casing, so as to follow a helical path. The first medium is thereby given a substantial velocity component across the tubes 5, thereby yielding higher heat transfer rates than would be obtained without the baffles. The barriers formed by the supports 4 in cooperation with the tubes 5 minimize turbulent flow around the baffle edges and thereby avoid dead spots on the downstream side of each baffle, further contributing to heat exchanger efficiency.

A particular advantage of the invention is that the supports 4 function not only as structural members to interconnect the baffles, but also as fluid barriers which prevent undesirable flow disruptions.

Inasmuch as the invention is subject to many variations and modifications, it is intended that all matter contained in the foregoing description or shown in the accompanying drawings shall be interpreted as illustrative and not in a limiting sense.

What I claim is:

1. A tube bundle heat exchanger comprising:
   (a) a tubular outer casing for containing a first heat exchange medium,
   (b) a plurality of spaced parallel tubes within said casing for containing a second heat exchange medium,
   (c) a series of baffle plates within said casing, each extending transversely of said tubes and each having a sector angle of less than 180°,
   (d) successive baffle plates being positioned in stepped relation to one another so as to define a helical flow path for the first heat exchange medium, and
   (e) a plurality of spacing supports connected between each successive pair of baffle plates,
   (f) at least some of said supports extending parallel to said tubes and being positioned along a radius of the casing between adjacent tubes so as to substantially form a barrier between the tubes to permit flow between said successive pair of baffle plates along the helical flow path, to constrain the first medium to follow said helical flow path.

2. The invention of claim 1 wherein all of said supports are substantially identical to provide a uniform axial spacing between successive baffle plates.

3. The invention of claim 1 or 2 wherein each of the supports is generally cylindrical.

4. The invention of claim 1 wherein each baffle plate has bores through each of which one of said tubes extends.

5. The invention of claim 1 or 4 wherein at least one edge of each baffle plate conforms to the shape of its neighboring tubes.

* * * * *